(12) United States Patent
Liu (10) Patent No.: US 10,001,587 B2
(45) Date of Patent: Jun. 19, 2018

(54) BRIGHTNESS ENHANCEMENT FILM

(71) Applicant: 3M INNOVATIVE PROPERTIES COMPANY, St. Paul, MN (US)

(72) Inventor: Richard Y. Liu, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 514 days.

(21) Appl. No.: 14/671,148

(22) Filed: Mar. 27, 2015

(65) Prior Publication Data

US 2016/0282523 A1 Sep. 29, 2016

(51) Int. Cl.
*G02B 5/04* (2006.01)
*G02B 1/04* (2006.01)
*G02B 5/02* (2006.01)
*G02B 1/14* (2015.01)

(52) U.S. Cl.
CPC ............... *G02B 5/045* (2013.01); *G02B 1/04* (2013.01); *G02B 1/14* (2015.01); *G02B 5/0294* (2013.01); *Y10T 428/1036* (2015.01); *Y10T 428/1041* (2015.01)

(58) Field of Classification Search
CPC . G02B 5/04; G02B 5/02; G02B 5/021; G02B 5/0215; G02B 5/0221; G02B 5/0226; G02B 5/0231; G02B 5/0294; G02B 1/04; G02B 1/14; G02B 2307/408; G02B 2307/42; G02B 27/36; C08L 67/00; Y10T 428/1036; Y10T 428/1041
USPC ....... 428/1.1, 1.3, 1.31, 480; 349/61, 62, 64, 349/112; 359/599, 625
See application file for complete search history.

(56) References Cited

U.S. PATENT DOCUMENTS

| | | |
|---|---|---|
| 5,175,030 A | 12/1992 | Lu |
| 5,882,774 A | 3/1999 | Jonza |
| 5,932,626 A | 8/1999 | Fong |
| 6,052,164 A | 4/2000 | Cobb, Jr. |
| 6,091,547 A | 7/2000 | Gardiner |
| 6,107,364 A | 8/2000 | Fong |
| 6,322,236 B1 | 11/2001 | Campbell |
| 6,352,761 B1 * | 3/2002 | Hebrink ............... A61B 5/0803 359/485.04 |

(Continued)

FOREIGN PATENT DOCUMENTS

| | | |
|---|---|---|
| KR | 10-2010-0095926 | 9/2010 |
| KR | 10-2014-0145105 | 12/2014 |

(Continued)

*Primary Examiner* — Ruiyun Zhang
(74) *Attorney, Agent, or Firm* — Clifton F. Richardson (57) ABSTRACT

A brightness enhancement film including a monolithic layer and a microstructured layer adjacent the monolithic layer. The microstructured layer has a first major surface and an opposing second major surface. The first major surface includes a first plurality of microstructures and the second major surface faces the first monolithic layer. The monolithic layer includes a polyester that includes at least about 70 mole percent naphthalenedicarboxylate groups based on total carboxylate groups. The polyester may include one or more catalysts having a total concentration by weight in a range of 10 to 1000 ppm. The first monolithic layer has a thickness in the range of about 5 µm to about 300 µm. The first monolithic layer may be substantially free of non-catalyst particulate matter and may have a haze of less than 1 percent.

23 Claims, 3 Drawing Sheets

(56) References Cited

U.S. PATENT DOCUMENTS

| | | |
|---|---|---|
| 6,760,157 B1 | 7/2004 | Allen |
| 7,251,079 B2 | 7/2007 | Capaldo |
| 7,777,832 B2 | 8/2010 | Richard |
| 7,943,206 B2 | 5/2011 | Jones |
| 8,802,226 B2 | 8/2014 | Eveson |
| 2006/0228559 A1 | 10/2006 | Denker et al. |
| 2007/0115407 A1* | 5/2007 | Richard ............ G02F 1/133536 349/112 |
| 2007/0242184 A1 | 10/2007 | Ohta |
| 2009/0273836 A1 | 11/2009 | Yust |
| 2009/0310222 A1 | 12/2009 | Pudleiner et al. |
| 2010/0124667 A1 | 5/2010 | Liu |
| 2011/0019280 A1 | 1/2011 | Lockridge et al. |
| 2012/0064296 A1 | 3/2012 | Walker, Jr. |
| 2013/0004728 A1 | 1/2013 | Boyd |
| 2014/0016208 A1 | 1/2014 | Edmonds |
| 2014/0093119 A1 | 4/2014 | Kagawa |

FOREIGN PATENT DOCUMENTS

| | | |
|---|---|---|
| WO | WO 1999-36262 | 7/1999 |
| WO | WO 2007-092541 | 8/2007 |
| WO | WO 2009-076284 | 6/2009 |
| WO | WO 2009-120574 | 10/2009 |
| WO | WO 2009-123949 | 10/2009 |

\* cited by examiner

FIG. 6

BRIGHTNESS ENHANCEMENT FILM

BACKGROUND

Brightness enhancement films may be included in a display to provide improved on-axis brightness. Brightness enhancement films typically include a prism layer disposed on a polymeric substrate which is often a polyethylene terephthalate film. In some cases, a thin display is desired and a thinner brightness enhancement film is needed.

SUMMARY

In some aspects of the present description, a brightness enhancement film that includes a monolithic layer and a microstructured layer adjacent the monolithic layer is provided. The microstructured layer has a first major surface and an opposing second major surface where the first major surface includes a plurality of microstructures and the second major surface faces the first monolithic layer. The first monolithic layer includes a first polyester that includes at least about 70 mole percent naphthalenedicarboxylate groups based on total carboxylate groups and includes one or more catalysts having a total concentration by weight in a range of 10 to 1000 ppm. The monolithic layer has a thickness in the range of about 5 µm to about 300 µm. The monolithic layer is substantially free of light scattering, non-catalyst particulate matter.

In some aspects of the present description, a brightness enhancement film that includes a monolithic layer and a microstructured layer adjacent the monolithic layer is provided. The microstructured layer has a first major surface and an opposing second major surface where the first major surface includes a plurality of microstructures and the second major surface faces the first monolithic layer. The first monolithic layer includes a first polyester that includes at least about 70 mole percent naphthalenedicarboxylate groups based on total carboxylate groups. The monolithic layer has a thickness in the range of about 5 µm to about 300 µm. The monolithic layer has a haze less than about 1 percent.

DETAILED DESCRIPTION

In the following description, reference is made to the accompanying drawings that forms a part hereof and in which are shown by way of illustration. The drawings are not necessarily to scale. It is to be understood that other embodiments are contemplated and may be made without departing from the scope or spirit of the present disclosure. The following detailed description, therefore, is not to be taken in a limiting sense.

As used herein, layers, components, or elements may be described as being adjacent one another. Layers, components, or elements can be adjacent one another by being in direct contact, by being connected through one or more other components, or by being held next to one another or attached to one another. Layers, components, or elements that are in direct contact may be described as being immediately adjacent.

Brightness enhancement films (BEFs) that include a prism layer disposed on a polyethylene terephthalate (PET) substrate are known. Such BEFs are described, for example, in U.S. Pat. Nos. 7,777,832 (Richard et al.), U.S. Pat. No. 6,760,157 (Allen et al.), 6,091,547 (Gardiner et al.), U.S. Pat. No. 6,052,164 (Cobb et al.), and U.S. Pat. No. 5,175,030 (Lu et al.). BEFs can be used in any display that includes a backlight, such as conventional liquid crystal displays (LCDs). LCDs are often used in hand-held devices such as cell phones and tablet computers and it is often desired to make such displays as thin as possible. It is therefore often desired that any BEFs included in the display are as thin as possible. However, the substrate used in a BEF must have sufficient mechanical strength to prevent warping when included in a display. The PET substrate is often biaxially stretched to improve the mechanical properties of the substrate. Desirable mechanical properties of the substrate include high temperature stiffness, high modulus and high dimensional stability. However, when conventional PET substrates are made thinner, stiffness and dimensional stability can be sacrificed leading to undesired warping.

BEFs using polyethylene naphthalate (PEN) substrates have been described. However such BEFs are not used in commercially available displays because conventional PEN films can degrade the optical properties of a BEF. Such optical properties include the on-axis gain provided by the BEF when included in a display. The on-axis gain of a BEF refers to the ratio of the intensity of light as measured in a direction perpendicular to a backlight that includes the BEF to the intensity observed in a direction perpendicular to the same backlight without the BEF. The degraded optical properties of BEF including a PEN substrate has been generally believed to be due to the relatively (compared to PET) high absorbance and high refractive index of PEN. When used in a recycling backlight of a display, the high absorbance of a PEN film would have been expected to degrade the brightness of the display compared to using a PET film since more of the light would be absorbed by a PEN film than by a PET film. The high refractive index of PEN has been believed to cause further inefficiencies since this would cause more light incident on a PEN layer from air at high incidence angles to be reflected through total internal reflection (TIR) rather than transmitted through the PEN layer compared to a lower index PET layer.

As described in the Comparative Examples, BEF using conventional PEN substrates do indeed lead to poorer optical performance (e.g., poorer on-axis gain when used in a recycling backlight system) compared to using PET substrates. However, according to the present description, it has been discovered that optically improved PEN or other naphthalenedicarboxylate (NDC)-rich substrates can be prepared such that BEFs using the optically improved PEN or other NDC-rich substrates give comparable optical performance (e.g., on-axis gain when used in a display) to BEFs using PET substrates while providing improved mechanical properties such as improved high temperature stiffness, modulus and dimensional stability compared to BEFs using PET substrates. Such PEN or other NDC-rich substrates can be made thinner than PET substrates while still providing adequate mechanical strength. For example, in some embodiments, it has been found that BEFs using NDC-rich substrates can be thinner than a BEF using a PET substrate by about 10 to about 20 µm while providing comparable mechanical properties. In some embodiments, it has been found that BEFs using NDC-rich substrates can provide a thickness reduction of about 20 to about 30 percent over a BEF using a PET substrate while providing comparable mechanical properties.

In conventional displays, a diffuser is typically included between the backlight and the display panel in order to improve the uniformity of the light output of the display and/or hide optical defects in the backlight system. Such diffusers can be integrated into a BEF film as described, for example, in PCT Pub. No. 2014/093119 (Boyd et al.). Since a diffuser is generally desirable in a display system, it has conventionally been held that some degree of haze is acceptable or desirable in a BEF substrate. For example, U.S. Pat. No. 7,251,079 (Capaldo et al.) describes a substrate for a brightness enhancement film having a desired haze of 20 percent to 80 percent. According to the present description, it has been discovered that BEFs using an optically improved NDC-rich substrate that has a low haze (e.g., less than 1 percent) gives unexpectedly improved gain compared to using conventional PEN substrates. Since a degree of overall haze or diffusion for a brightness enhancement film may be desired, one or more separate diffuser layers may be included in the brightness enhancement films of some embodiments of the present description. The separate diffuser layer may be a surface diffuser (i.e., a layer with a microstructured surface configured to diffuse light passing through the surface).

The substrates used in the BEFs of the present description may be optically improved compared to conventional substrates by one or more of the following: using polymers substantially free of light scattering, non-catalyst particulate matter; using a total concentration of catalyst high enough to provide adequate reaction rates but low enough that the haze remains low; and using a high quench rate to cool extruded polymer to form the substrate. The resulting substrates may be free or substantially free of any large crystallites. This may be desirable for achieving the optical improvements of the BEFs described in the present description. The resulting substrates may have a low haze (less than 1 percent, for example) and may be substantially transparent in the visible wavelength range (e.g., wavelengths in the range of about 400 nm to about 700 nm). The total luminous transmittance (the ratio of the luminous flux transmitted by a body to the flux incident upon it) of the substrate, which may be determined according to the ASTM D1003-13 test standard, may be at least about 85 percent or may be at least about 90 percent, for example.

Particulate matter is often included in polymeric films. Such particulate matter may include slip agents that prevent layers of the film from sticking together when the film is wound into a roll and may include catalysts which increase the rate of polymerization of monomers used in the production of the films. Particulate matter may be particulate inorganic filler particles or may be particulate incompatible resin-based filler. Particulate matter, such as slip agents, may scatter light and thereby increase the haze of the film. Slip agents are desirable in conventional films from the point of view of manufacturability. However, according to the present description, it has been discovered that removing such slip agents can lead to optically improved substrates where the improvement in optical quality out weights possible manufacturing issues associated with the absence of slip agents. Accordingly, the substrates used with the BEFs of the present description may be substantially free of light scattering, non-catalyst particulate matter. As used herein, light scattering, non-catalyst particulate matter refers to any particulate matter other than catalysts or catalyst residues which can cause scattering of light passing through the substrate. The optical improvements from eliminating light scattering, non-catalyst matter include a lowered haze of the substrate. Films not having slip agent that are suitable for use as substrates in the BEFs of the present description may be made on a roll by knurling the edges of the film prior to winding onto the roll. Non-knurled portions of the film may be used in the substrates of BEFs.

A substrate may be said to be substantially free of light scattering, non-catalyst particulate matter if the level of light scattering, non-catalyst particulate matter is low enough that it provides a negligible contribution to the haze of the substrate. In some embodiments, the level of light scattering, non-catalyst particulate matter included in the substrate may be less than 0.1 weight percent, less than 0.05 weight percent, less than 0.02 weight percent, or less than 0.01 weight percent of the substrate. In some embodiments, any light scattering, non-catalyst particulate matter in the substrate may be included only in trace amounts or may not be present at all. In some embodiments, the substrates of the present description may include non-light scattering particulate matter which negligibly affects the haze of the substrate. Such non-light scattering matter may be inert particulate nanoparticles, for example, which are small compared to the wavelength of light. In other embodiments, the substrates of the present description may be substantially free of all non-catalyst particulate matter.

The substrates used in the BEFs of the present description may include NDC-rich polyesters. The polyesters may include carboxylate groups and diol groups and may include at least about 70 mole percent, or at least about 80 mole percent, or at least about 85 mole percent, or at least about 90 mole percent NDC groups based on total carboxylate groups. Suitable polyesters include polyethylene naphthalate (PEN). Other suitable polyesters include copolyesters of polyethylene naphthalate, such as CoPEN9010, a copolyethylene naphthalate/terephthalate copolymer which includes about 90 mole percent NDC groups based on total carboxylate groups and which is further described in the Examples. Other suitable NDC-rich compositions are described in U.S. Pat. App. Pub. No. 2009/0273836 (Yust et al.).

Copolyethylene naphthalate/terephthalate copolymers which include from about 70 mole percent to about 100 mole percent NDC groups based on total carboxylate groups (and which include up to about 30 mole percent terephthalate groups based on total carboxylate groups) all share the property of being appropriately crystallizable in nature to be effectively orientable during stretching at typical stretching conditions during film manufacture. Such oriented copolymer films may be useful as substrates of the brightness enhancement films of the present description. Suitable copolyethylene naphthalate/terephthalate copolymers can be prepared as described in PCT Publication WO 99/36262 (Hebrink et al.) entitled "MODIFIED COPOLYESTERS AND IMPROVED MULTILAYER REFLECTIVE FILMS", and as described in the Examples by adjusting the relative amounts of dimethyl naphthalene dicarboxylate and dimethyl terephthalate to give the desired mole percent of NDC groups based on total carboxylate groups.

Copolyethylene naphthalate/terephthalate copolymers can be prepared by reacting dimethyl naphthalene dicarboxylate, dimethyl terephthalate and a diol as described, for example, in PCT Publication WO 99/36262 (Hebrink et al.) and in the Examples. The resulting copolymers may be described as statistical or random copolymers. Alternatively, PET and PEN homopolymers can be prepared separately and blended together under heat. In such cases, block PET/PEN copolymers may result from transesterification reactions between PET and PEN molecules. Such transesterification reactions and the resulting compositions are described in U.S. Pat. App. Pub. No. 2010/0124667 (Liu et al.). In some embodiments, NDC-rich polyesters used in substrates of the brightness enhancement films are random copolymers and in some embodiments, the NDC-rich polyesters are block copolymers.

Polyesters which can be used in substrates of brightness enhancement films may be prepared using one or more catalysts to increase the rate of polymerization of carboxylate groups and diol groups. Suitable catalysts include zinc (II) acetate, manganese (II) acetate, cobalt (II) acetate, antimony (III) acetate or combinations thereof. Such catalysts are typically included in a resin as particles. It is generally desired to have enough catalyst present that the polymerization proceeds at a reasonable rate. According the present description, it has been found that a level of catalyst lower than conventionally used in making polyester substrates can be advantageous in producing a low haze substrate. In some embodiments, the total concentration by weight of catalyst included in the substrate is less than 1000 ppm, or less than 800 ppm, or less than 500 ppm and may be greater than 10 ppm, or greater than 20 ppm or greater than 30 ppm.

Substrate films can be prepared by extruding or coextruding polymers and then cooling the extrudate to form a film. If large crystallites are formed in the polymer as it cools, the contrast between crystalline regions and amorphous regions can result in a film having a high haze. To reduce the haze, a chill roll may be used to rapidly cool the extrudate (i.e., the chill roll provides a high quench rate) so that few crystallites that give rise to haze are formed.

The combination of using polymers substantially free of light scattering, non-catalyst particulate matter, using catalysts having a total concentration by weight in the range of 10 to 1000 ppm, and using a high quench rate can result in a film having improved optical properties, such as a high clarity and a low haze. In some embodiments, the brightness enhancement films have a substrate or a monolithic substrate layer that has a haze less than about 2 percent, less than about 1 percent, or less than about 0.5 percent. In contrast to this, commercially available PEN films thick enough to be useful as a substrate layer for a BEF film typically have a substantially higher haze. As shown in the Comparative Examples, when such commercially available PEN films are used in a BEF substrate, the BEF has poorer optical properties (e.g., lower on-axis gain) compared to the BEFs of the present description. In some embodiments, the BEFs of the present description have an on-axis gain (which may correspond to the optical effective transmission gain discussed in the Examples) of at least 1.5 or at least 1.6. In some embodiments, the BEFs have an on-axis gain in a range of 1.5 to 2.5, or in a range of 1.6 to 2.0, or in a range of 1.6 to 1.9.

Haze can be defined as the percent of transmitted light that is scattered so that its direction deviates more than 2.5 degrees from the direction of the incident beam as specified in ASTM D1003-13 "Standard Test Method for Haze and Luminous Transmittance of Transparent Plastics". Haze can be determined using a HAZE-GARD PLUS meter available from BYK-Gardner Inc. (Silver Springs, Md.) which is said to comply with the ASTM D1003-13 standard.

In some embodiments, the intrinsic viscosity of the substrate films of the present description is less than 0.5 dL/g. The intrinsic viscosity of the substrate films may be determined according to ASTM D4603-03 "Standard Test Method for Determining Inherent Viscosity of Poly(Ethylene Terephthalate) (PET) by Glass Capillary Viscometer" except that the substrate film is used in place of the PET. In some embodiments, the intrinsic viscosity of the substrate films may be at least 0.45 dL/g and less than 0.5 dL/g or may be in a range of 0.47 to 0.49 dL/g. Intrinsic viscosities in these ranges can be obtained by conventional condensation polymerization processes. The intrinsic viscosity can be further increased using solid state polymerization techniques after the polymers are formed from monomers in a condensation polymerization process. However, substrates with higher intrinsic viscosities made by conventional solid state polymerization processes may be less desirable for use in brightness enhancement films than substrates having an intrinsic viscosity in the 0.45 to 0.5 dL/g range due to the cost associated with the extra solid state polymerization step.

The mechanical properties of the substrate films of the present description can be improved by stretching the film (e.g., uniaxially or biaxially) as this can partially orient polymer molecules leading to greater stiffness. The stretched film typically exhibits birefringence. A useful measure of the degree of stretching to which a substrate has been subjected is the out-of-plane birefringence which may be defined to be the average of the in-plane refractive indices minus the out-of-plane refractive index. This can be expressed as $$(n_x+n_y)/2-n_z$$

where nx and ny refer to the indices of refraction along two orthogonal in-plane directions (e.g., the machine direction and the transverse direction) and nz refers to the index of refraction in the out-of-plane direction. In some embodiments, an NDC-rich polyester film used as a substrate or as a layer in a substrate for a BEF has an out-of-plane birefringence having an absolute value of at least about 0.1, or at least about 0.15, or at least about 0.2. In some embodiments, the NDC-rich polyester substrate has an out-of-plane birefringence less than about 0.7, or less than about 0.6, or less than about 0.5. As used herein, refractive indices refer to refractive indices measured at 25° C. using light having a wavelength of 532 nm, unless specified otherwise.

Figure 1:
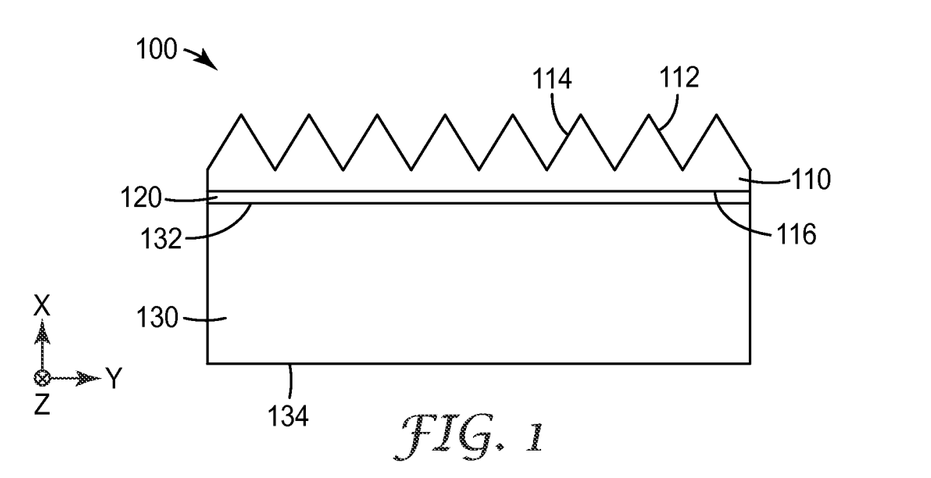
FIGS. 1-5 are cross-sectional views of a brightness enhancement films.

FIG. 1 is a cross-sectional view of brightness enhancement film 100 which includes a microstructured layer 110 having a first major surface 112, which includes a plurality of microstructures 114, and having an opposing second major surface 116. Microstructured layer 110 is adjacent monolithic layer 130. In the illustrated embodiment, a primer layer 120 is disposed between microstructured layer 110 and monolithic layer 130 such that microstructured layer 110 is immediately adjacent primer layer 120 and monolithic layer 130 is immediately adjacent primer layer 120 opposite microstructured layer 110. Monolithic layer 130 includes a major surface 132 on which is disposed primer layer 120 and includes an opposing major surface 134. The plurality of microstructures 114 may be linear prisms and may extend in a first direction (e.g., the Z-direction, which is into the page of FIG. 1). The monolithic layer 130 may be an NDC-rich polyester film layer as described elsewhere.

Primer layers, such as primer layer 120, are often used in BEF constructions to improve the bond between a microstructured layer (e.g., a prism layer) and a substrate. However, any of the primer layers used in any of the BEF constructions of the present description may optionally be omitted and the microstructured layer may be applied directly to the monolithic layer. For example, in an alternate embodiment to that shown in FIG. 1, microstructured layer 110 may be in direct contact with monolithic layer 130 with no intervening primer layer. In still other embodiments, the primer layer may be replaced with an adhesive layer or a combination of adhesive and primer layers may be used.

The monolithic layer 130 may be substantially thicker than the optically thin layers or microlayers used in multilayer optical films (MOFs) to provide desirable transmission and/or reflection. Such MOFs are described in U.S. Pat. No. 5,882,774 (Jonza et al.), for example. Layers in such MOFs need to be thin compared to a wavelength of light (for example, the optical thickness (refractive index times physical thickness) of such a layer may be about a quarter of a wavelength of light of interest). In contrast to this, layers of the NDC-rich layers useful in the BEFs of the present description may be much thicker so that they provide mechanical strength to the BEF. For example, monolithic layer 130, may have a thickness greater than about 5 µm, or greater than about 10 µm, or greater than about 15 µm, or greater than about 20 µm, or greater than about 25 µm. Monolithic layer 130 may have a thickness less than about 300 µm, or less than about 200 µm, or less than about 100 µm.

Microstructured layer 110 can be prepared by any suitable method; for example, by casting and curing a layer applied onto primer layer 120. Suitable processes and materials for casting and curing a structured layer are described in U.S. Pat. No. 5,175,030 (Lu et al.), for example. Alternatively, the microstructured layer 110 can be embossed or machined after applying an unstructured layer onto primer layer 120 or a separate layer may be embossed or machined and then attached (e.g., laminated with an adhesive layer) onto primer layer 120. Microstructured layer 110 can be any substantially transparent material. For example, microstructured layer 110 can be made from an acrylate or a methacrylate.

Figure 2:
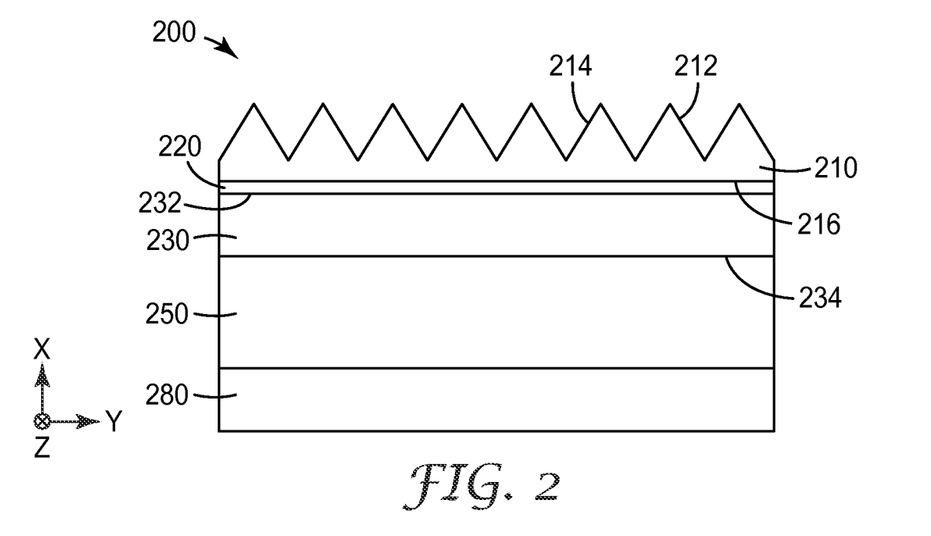

The brightness enhancement films may include additional layers, such as additional substrate layers or additional microstructured layers. FIG. 2 is a cross-sectional view of brightness enhancement film 200 which includes a microstructured layer 210 having a first major surface 212, which includes a plurality of microstructures 214, and having an opposing second major surface 216. Microstructured layer 210 is adjacent first monolithic layer 230. In the illustrated embodiment, a primer layer 220 is disposed between microstructured layer 210 and first monolithic layer 230 such that microstructured layer 210 is immediately adjacent primer layer 220 and first monolithic layer 230 is immediately adjacent primer layer 220 opposite microstructured layer 210. First monolithic layer 230 includes a major surface 232 on which is disposed primer layer 220 and includes an opposing major surface 234. The plurality of microstructures 214 may be linear prisms and may extend in a first direction (e.g., the Z-direction, which is into the page of FIG. 2). The first monolithic layer 230 may be an NDC-rich polyester film layer as described elsewhere.

Brightness enhancement film 200 further includes second monolithic layer 250 adjacent first monolithic layer 230 opposite microstructured layer 210, and includes third monolithic layer 280 adjacent second monolithic layer 250 opposite first monolithic layer 230. Second and third monolithic layers 250 and 280 may be any suitable substrates. In some embodiments, second monolithic layer 250 is a PET layer (or other low cost polymer layer) while first and third monolithic layers 230 and 280 are NDC-rich layers as described elsewhere. Such embodiments may provide useful mechanical properties at a lower cost than a single thicker NDC-rich layer since PET is typically less expensive that NDC-rich polymers, and having relatively high modulus NDC-rich layers separated by a PET layer provides much of the stiffness of a thicker NDC-rich layer. In some embodiments, first and third monolithic layers 230 and 280 each have a thickness in the ranges described elsewhere. For example, each of first and third monolithic layers 230 and 280 may have a thickness in the range of about 5 µm to about 300 µm. In some embodiments, second monolithic layer 250 has a thickness greater than that of first monolithic layer 230 and greater than that of third monolithic layer 280. In some embodiments, the overall thickness of brightness enhancement film 200 is less than about 300 µm.

Figure 3:
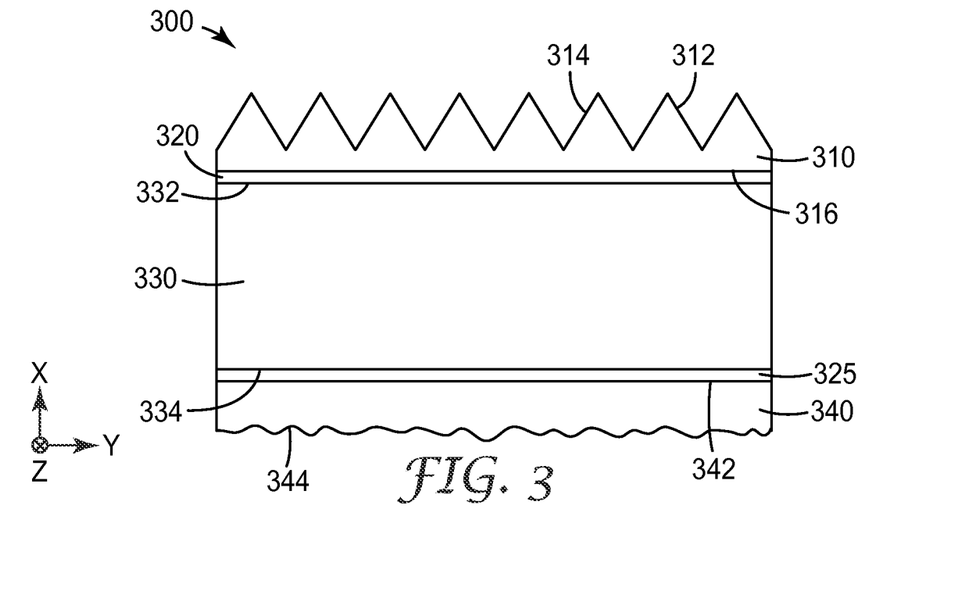

FIG. 3 is a cross-sectional view of brightness enhancement film 300 which includes a microstructured layer 310 having a first major surface 312, which includes a plurality of microstructures 314, and having an opposing second major surface 316. Microstructured layer 310 is adjacent monolithic layer 330. In the illustrated embodiment, a primer layer 320 is disposed between microstructured layer 310 and monolithic layer 330 such that microstructured layer 310 is immediately adjacent primer layer 320 and monolithic layer 330 is immediately adjacent primer layer 320 opposite microstructured layer 310. Monolithic layer 330 includes a major surface 332 on which is disposed primer layer 320 and includes an opposing major surface 334. The plurality of microstructures 314 may be linear prisms and may extend in a first direction (e.g., the Z-direction, which is into the page of FIG. 3). The monolithic layer 330 may be an NDC-rich polyester film layer as described elsewhere and may have a thickness in the thickness ranges described elsewhere.

Brightness enhancement film 300 further includes a primer layer 325 disposed on major surface 334 and durable layer 340 disposed on primer layer 325 so that durable layer 340 is adjacent monolithic layer 330 opposite microstructured layer 310. Durable layer 340 includes inner major surface 342 facing monolithic layer 330 and includes outer major surface 344 opposite inner major surface 342. In some embodiments, outer major surface 344 is a microstructured surface. Such a surface can be prepared, for example, by casting and curing durable layer 340 on primer layer 325. The microstructured surface could also be prepared by machining or embossing durable layer 340. Durable layer 340 may be a hard coat layer and may be formed using a radiation (e.g., ultraviolet) curable material such as an acrylate or methacrylate. Alternatively, primer layer 325 may be replaced with an adhesive layer or a combination of primer and adhesive layers and a separately formed durable layer may 340 may be laminated to monolithic layer 330. In such embodiments, one or both of outer major surface 344 and inner major surface 342 may be microstructured. The microstructured surface or surfaces of durable layer 340 may include light diffusing microstructures so that durable layer 340 is a surface diffuser. It may be desirable to include a diffuser to improve uniformity of a display incorporating the brightness enhancement film. Suitable microstructured surfaces are described in U.S. Pat. App. Pub. No. 2012/0064296 (Walker et al.), for example.

Figure 4:
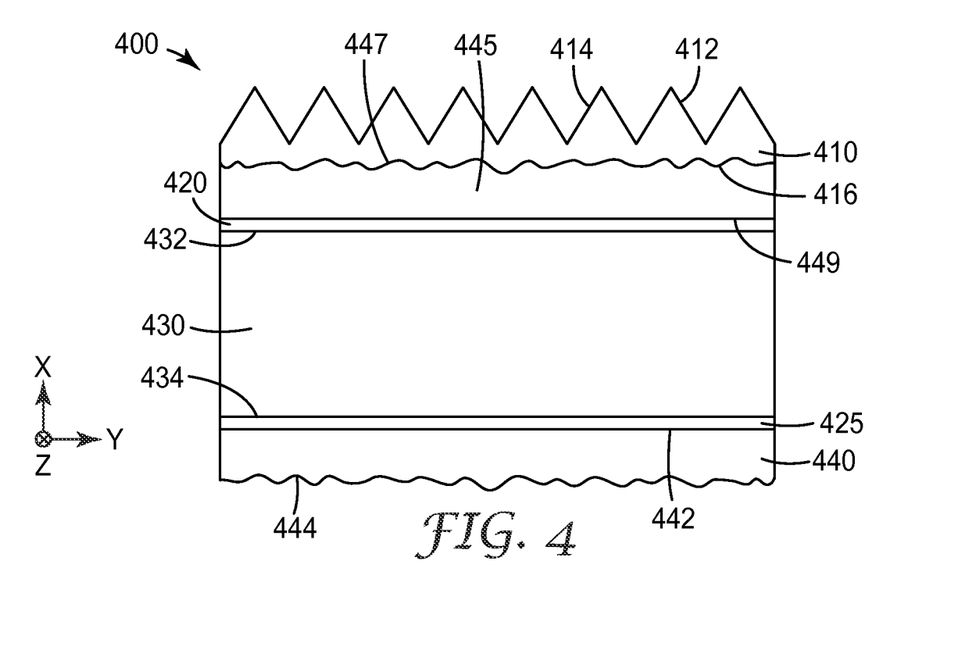

FIG. 4 is a cross-sectional view of brightness enhancement film 400 which includes a first microstructured layer 410 having a first major surface 412, which includes a plurality of microstructures 414, and having an opposing second major surface 416. Microstructured layer 410 is adjacent monolithic layer 430. In the illustrated embodiment, a primer layer 420 and a second microstructured layer 445 are disposed between first microstructured layer 410 and monolithic layer 430 such that first microstructured layer 410 is immediately adjacent second microstructured layer 445 which is immediately adjacent primer layer 420 and monolithic layer 430 is immediately adjacent primer layer 420 opposite first microstructured layer 410. In other embodiments, one or more additional primer or adhesive layers may be present between any of first and second microstructured layers 410 and 445 and monolithic layer 430. Monolithic layer 430 includes a major surface 432 on which is disposed primer layer 420 and includes an opposing major surface 434. The plurality of microstructures 414 may be linear prisms and may extend in a first direction (e.g., the Z-direction, which is into the page of FIG. 4). The monolithic layer 430 may be an NDC-rich polyester film layer as described elsewhere and may have a thickness in the thickness ranges described elsewhere.

Second microstructured layer 445 includes outer major surface 447 and inner major surface 449. In some embodiments, outer major surface 447 is a microstructured surface. Such a surface can be prepared, for example, by casting and curing second microstructured layer 445 on primer layer 420. The second microstructured layer 445 could also be prepared by machining or embossing outer major surface 447 after an unstructured layer is applied to primer layer 420. After second microstructured layer 445 has been prepared, another layer can be cast and cured onto outer major surface 447 to form first microstructured layer 410. In other embodiments, first and second microstructured layers 410 and 445 may be attached together and then laminated to monolithic layer 430. One or both of outer major surface 447 and inner major surface 449 may be microstructured. In still other embodiments, first and second layers 410 and 445 may be replaced with a single layer having microstructures on both opposing major surfaces and then this single layer may be laminated to monolithic layer 430. Second microstructured layer 445 may be formed using a radiation (e.g., ultraviolet) curable material such as an acrylate or methacrylate. It may be desirable to include a diffuser to improve uniformity of a display incorporating the brightness enhancement film. The microstructured surface of second microstructured layer 445, which may be outer major surface 447, may include light diffusing microstructures so that second microstructured layer 445 is a surface diffuser. Suitable microstructured surfaces are described U.S. Pat. App. Pub. No. 2012/0064296 (Walker et al.), for example.

Brightness enhancement film 400 further includes a primer layer 425 disposed on major surface 434 and durable layer 440 disposed on primer layer 425 so that durable layer 440 is adjacent monolithic layer 430 opposite first microstructured layer 410. Durable layer 440 includes inner major surface 442 facing monolithic layer 430 and includes outer major surface 444 opposite inner major surface 442. In some embodiments, outer major surface 444 is a microstructured surface. Such a surface can be prepared, for example, by casting and curing durable layer 440 on primer layer 425. The microstructured surface could also be prepared by machining or embossing durable layer 440. Durable layer 440 may be a hard coat layer and may be formed using a radiation (e.g., ultraviolet) curable material such as an acrylate or methacrylate. Alternatively, primer layer 425 may be replaced with an adhesive layer or a combination of primer and adhesive layers and a separately formed durable layer may 440 may be laminated to monolithic layer 430. In such embodiments, one or both of outer major surface 344 and inner major surface 342 may be microstructured. The microstructured surface or surfaces of durable layer 440 may include light diffusing microstructures so that durable layer 440 is a surface diffuser. Suitable microstructured surfaces are described in U.S. Pat. App. Pub. No. 2012/0064296 (Walker et al.), for example.

Figure 5:
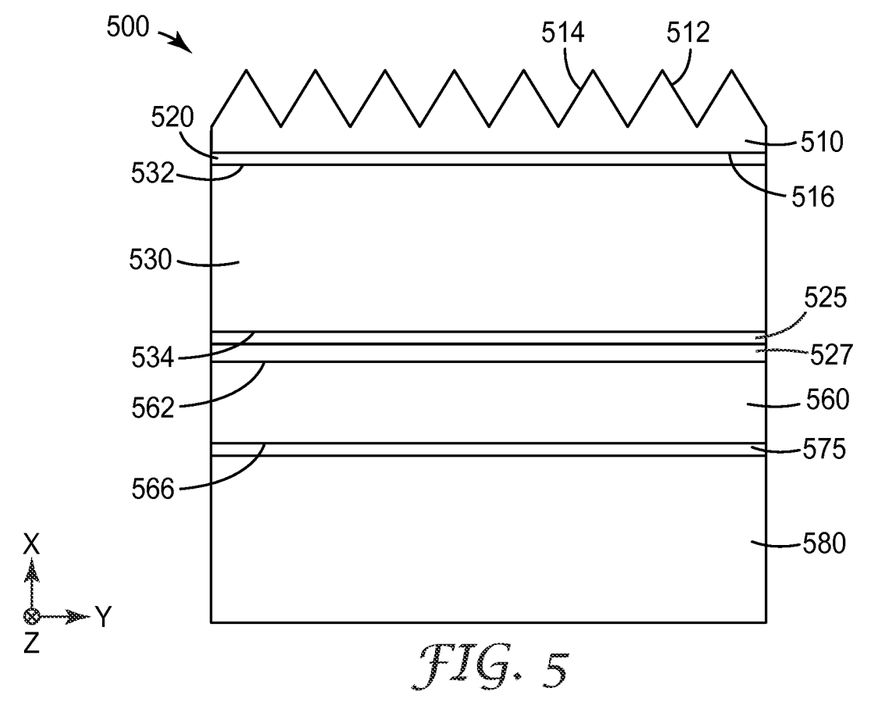

FIG. 5 is a cross-sectional view of brightness enhancement film 500 which includes a first microstructured layer 510 having a first major surface 512, which includes a first plurality of microstructures 514, and having an opposing second major surface 516. First microstructured layer 510 is adjacent first monolithic layer 530. In the illustrated embodiment, a first primer layer 520 is disposed between first microstructured layer 510 and first monolithic layer 530 such that first microstructured layer 510 is immediately adjacent first primer layer 520 and first monolithic layer 530 is immediately adjacent first primer layer 520 opposite first microstructured layer 510. First monolithic layer 530 includes a major surface 532 on which is disposed first primer layer 520 and includes an opposing major surface 534 on which is disposed a second primer layer 525. The first plurality of microstructures 514 may be linear prisms and may extend in a first direction (e.g., the Z-direction, which is into the page of FIG. 5). The first monolithic layer 530 may be an NDC-rich polyester film layer as described elsewhere and may have a thickness in the thickness ranges described elsewhere.

Brightness enhancement film 500 further includes a second microstructured layer 560 having a first major surface 562, which includes a second plurality of microstructures (not shown), and having an opposing second major surface 566. Second microstructured layer 560 is adjacent second monolithic layer 580. In the illustrated embodiment, a second primer layer 575 is disposed between second microstructured layer 560 and second monolithic layer 580 such that second microstructured layer 560 is immediately adjacent second primer layer 575 and second monolithic layer 580 is immediately adjacent second primer layer 575 opposite second microstructured layer 560. The second plurality of microstructures may be linear prisms and may extend in a second direction (e.g., the Y-direction) which may be different (e.g., orthogonal) from the first direction. The second monolithic layer 580 may be an NDC-rich polyester film layer as described elsewhere and may have a thickness in the thickness ranges described elsewhere.

Second microstructured layer 560 is attached to the first monolithic layer 530 through adhesive layer 527 and primer layer 525. Such attachment can be facilitated by using a second plurality of microstructures that include prisms having elongated tips for penetrating into adhesive layer 527. Such prisms are described, for example, in U.S. Pat. App. Pub. No. 2014/0016208 (Edmonds et al.). Including two microstructured layers can improve on-axis gain, for example, compared to a single microstructured layer. The on-axis gain for brightness enhancement film 500 may be, for example, greater than 1.9 or greater than 2.0.

Additional layers having one or more microstructured surfaces can be included adjacent either major surface of either monolithic layer of brightness enhancement film 500. Such structures may be used to provide diffusion as described elsewhere. For example, a durable layer having a microstructured surface can be disposed adjacent second monolithic layer 580 opposite second microstructured layer 560.

Figure 6:
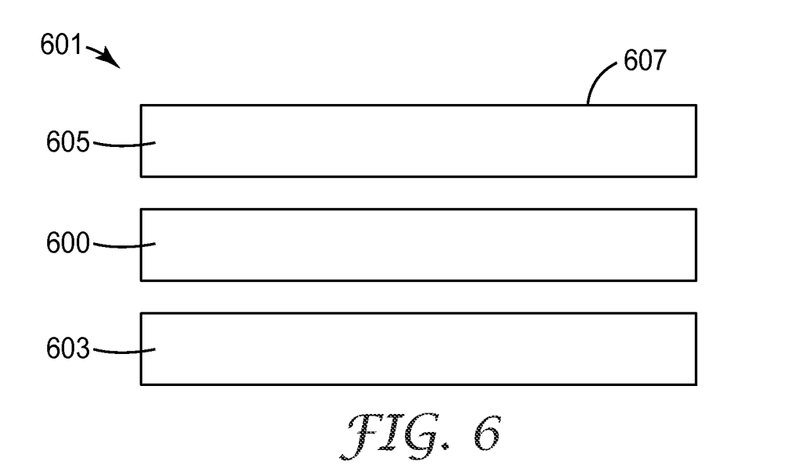
FIG. 6 is a schematic cross-sectional view of a display including a brightness enhancement film.

FIG. 6 is a schematic illustration of a display 601 including a display panel 605 having an output surface 607, a brightness enhancement film 600 disposed adjacent the display panel opposite output surface 607, and a backlight 603 disposed adjacent the brightness enhancement film 600 opposite the display panel 605. The brightness enhancement film 600 may be any of the brightness enhancement films described herein. The brightness enhancement film 600 may increase the on-axis brightness of display 601 by recycling light that would have otherwise exited display 601 at a high angle relative to the normal of output surface 607.

EXAMPLES

All parts, percentages, ratios, etc. in the Examples are by weight, unless noted otherwise. Solvents and other reagents are available from Sigma-Aldrich Chemical Company (Milwaukee, Wis.), unless specified differently.

Haze Measurements

Haze was determined using a HAZE-GARD PLUS haze meter available from BYK-Gardner, Columbia, Md.

Gain Measurements

Effective transmission (optical ET gain) values disclosed herein were measured as described in U.S. Pat. Pub. No. 2013/0004728 (Boyd et al.). In this approach, a sample whose ET gain is to be measured is placed between a hollow Lambertian light box and a reflective polarizer with the side of the sample having light recycling structures (e.g., linear prisms) facing the reflective polarizer. The light box, the sample, the reflective polarizer and a detector on the opposite side of the reflective polarizer from the sample are centered on an optical axis. The transmission measured by the detector when the light recycling structures extend along the polarization axis of the reflective polarizer is determined and a ratio of this transmission to the transmission measured by the detector without the sample in place is determined. Similarly, the transmission measured by the detector when the light recycling structures extend orthogonal to the polarization axis of the reflective polarizer is determined and a ratio of this transmission to the transmission measured by the detector without the sample in place is determined. The average of these two transmission ratios is the ET gain value. An ET gain of 1.00 corresponds to no brightness enhancement. The higher the value of ET gain, the more brightness enhancement (i.e., the higher the on-axis gain) is expected when the sample is used in a liquid crystal display device.

The detector used for the optical ET gain values reported in the Examples was an EPP2000 spectrometer (available from StellarNet Inc, Tampa, Fla.). The spectrometer was connected to a collimating lens via a Vis-NIR fiber optic cable (available as F1000-Vis-NIR from StellarNet Inc, Tampa, Fla.). The collimating lens included a lens tube (available as SM1L30 from Thorlabs, Newton, N.J.) and a plano-convex lens (available as LA1131 from Thorlabs, Newton, N.J.). The collimating lens produced a focused spot size of about 5 mm at the detector. The detector was oriented along the optical axis. The linear absorbing polarizer was a Melles Griot 03 FPG 007 (available from CVI Melles Griot, Albuquerque, N. Mex.) and was mounted on a rotary stage. The light box was a six-sided hollow rectangular solid with approximate dimensions 12.5 cm by 12.5 cm by 11.5 cm made from diffuse PTFE plates about 0.6 mm thick. The light box had an average total diffuse reflectance of about 83%, measured at the emitting surface, over the visible range. The light box was illuminated by a stabilized broadband incandescent light source that was connected to an interior of the light box via an optic fiber bundle (available as Fostec DCR-III with a one cm diameter fiber bundle extension from Schott North America, Southbridge Mass.).

Preparation of PEN

Polyethylene naphthalate (PEN) was synthesized in a batch reactor with the following raw material charge: dimethyl naphthalene dicarboxylate (136 kg), ethylene glycol (73 kg), manganese (II) acetate (27 g), cobalt (II) acetate (27 g) and antimony (III) acetate (48 g). Under a pressure of 20 psig (138 kPa), this mixture was heated to 254° C. while removing methanol (a transesterification reaction by-product). After 35 kg of methanol was removed, triethyl phosphonoacetate (49 g) was charged to the reactor and the pressure was gradually reduced to 1 torr (131 N/m$^2$) while heating to 290° C. The condensation reaction by-product, ethylene glycol, was continuously removed until a polymer with an intrinsic viscosity of 0.48 dL/g (as measured in 60/40 wt. % phenol/o-dichlorobenzene at 23° C.) was produced.

Preparation of CoPEN9010

Copolyethylene naphthalate/terephthalate copolymer (CoPEN9010) was synthesized in a batch reactor with the following raw material charge: 126 kg dimethyl naphthalene dicarboxylate, 11 kg dimethyl terephthalate, 75 kg ethylene glycol, 27 g manganese (II) acetate, 27 g cobalt (II) acetate, and 48 g antimony (III) triacetate. Under pressure of 20 psig (138 kPa), this mixture was heated to 254° C. while removing methanol. After 36 kg of methanol was removed, 49 g of triethyl phosphonoacetate was charged to the reactor and then the pressure was gradually reduced to 1 torr while heating to 290° C. The condensation reaction by-product, ethylene glycol, was continuously removed until a polymer with an intrinsic viscosity of 0.50 dL/g, as measured in 60/40 wt. % phenol/o-dichlorobenzene at 23° C., was produced.

Preparation of Brightness Enhancement Films

Brightness Enhancement Films (BEFs) were prepared by casting and curing a polymerizable material onto a substrate as described in U.S. Pat. No. 7,943,206 (Jones et al.). The casting was done against a tool that provided the outer major surface of the material with a linear prismatic structured surface. The BEFs had linear prisms with a uniform pitch of 24 micrometers, a uniform height of 12 micrometers and a uniform orientation in transverse cross-section. The prisms had a refractive index of 1.57.

Comparative Example C-1

A brightness enhancement film was prepared using a 25 μm thick TEONEX Q51 film (a PEN film available from Dupont-Teijin Films, Chester, Va.) as the substrate in the process described in "Preparation of Brightness Enhancement films". The haze was determined as described in "Haze Measurements" and was found to be 13 percent. The optical ET gain was determined as described in "Gain Measurements" and was found to be 1.320.

Comparative Example C-2

A brightness enhancement film was prepared using a 50 μm thick TEONEX Q51 film (a PEN film available from Dupont-Teijin Films, Chester, Va.) as the substrate in the process described in "Preparation of Brightness Enhancement films". The haze was determined as described in "Haze Measurements" and was found to be 15 percent. The optical ET gain was determined as described in "Gain Measurements" and was found to be 1.210.

Comparative Example C-3

A brightness enhancement film was prepared using a 75 μm thick TEONEX Q51 film (a PEN film available from Dupont-Teijin Films, Chester, Va.) as the substrate in the process described in "Preparation of Brightness Enhancement films". The haze was determined as described in "Haze Measurements" and was found to be 25 percent. The optical ET gain was determined as described in "Gain Measurements" and was found to be 1.150.

Comparative Example C-4

A brightness enhancement film was prepared using a 76 μm (3 mil) thick biaxially-oriented PET film as the substrate in the process described in "Preparation of Brightness Enhancement films". The haze was determined as described in "Haze Measurements" and was found to be 0.5 percent. The optical ET gain was determined as described in "Gain Measurements" and was found to be 1.669.

Example 1

A 76 μm (3 mil) thick PEN film was made by extruding and biaxially stretching the PEN resin described in "Preparation of PEN". A brightness enhancement film was prepared using the PEN film as the substrate in the process described in "Preparation of Brightness Enhancement films". The haze was determined as described in "Haze Measurements" and was found to be 0.7 percent. The optical ET gain was determined as described in "Gain Measurements" and was found to be 1.668.

Example 2

A 76 μm (3 mil) thick CoPEN9010 film was made by extruding and biaxially stretching the PEN resin described in "Preparation of CoPEN9010". A brightness enhancement film was prepared using the CoPEN9010 film as the substrate in the process described in "Preparation of Brightness Enhancement films". The haze was determined as described in "Haze Measurements" and was found to be 0.3 percent. The optical ET gain was determined as described in "Gain Measurements" and was found to be 1.670.

Example 3

A 102 μm (4 mil) thick CoPEN9010 film was made by extruding and biaxially stretching the PEN resin described in "Preparation of CoPEN9010". A brightness enhancement film was prepared using the CoPEN9010 film as the substrate in the process described in "Preparation of Brightness Enhancement films". The haze was determined as described in "Haze Measurements" and was found to be 0.4 percent. The optical ET gain was determined as described in "Gain Measurements" and was found to be 1.667.

The following is a list of exemplary embodiments of the present description.

Embodiment 1 is a brightness enhancement film comprising:
a first monolithic layer;
a first microstructured layer adjacent the first monolithic layer, the first microstructured layer having a first major surface and an opposing second major surface, the first major surface comprising a first plurality of microstructures, and the second major surface facing the first monolithic layer;
wherein the first monolithic layer comprises a first polyester including at least about 70 mole percent naphthalenedicarboxylate groups based on total carboxylate groups and including one or more catalysts having a total concentration by weight in a range of 10 to 1000 ppm;
wherein the first monolithic layer has a thickness in the range of about 5 μm to about 300 μm; and
wherein the first monolithic layer is substantially free of light scattering, non-catalyst particulate matter.

Embodiment 2 is the brightness enhancement film of embodiment 1, wherein the first microstructured layer is immediately adjacent a primer layer and the first monolithic layer is immediately adjacent the primer layer opposite the first microstructured layer.

Embodiment 3 is the brightness enhancement film of embodiment 1, further comprising a second microstructured layer disposed between the first microstructured layer and the first monolithic layer, the second microstructured layer including light diffusing microstructures.

Embodiment 4 is the brightness enhancement film of embodiment 1, further comprising a durable layer adjacent the first monolithic layer opposite the first microstructured layer.

Embodiment 5 is the brightness enhancement film of embodiment 4, wherein the durable layer has a microstructured surface, the microstructured surface including light diffusing microstructures.

Embodiment 6 is the brightness enhancement film of embodiment 1, wherein the first monolithic layer has an out-of-plane birefringence having an absolute value of at least about 0.15.

Embodiment 7 is the brightness enhancement film of embodiment 1, further comprising a second monolithic layer adjacent the first monolithic layer opposite the first microstructured layer.

Embodiment 8 is the brightness enhancement film of embodiment 7, further comprising a third monolithic layer adjacent the second monolithic layer opposite the first monolithic layer,
wherein the third monolithic layer comprises a second polyester including at least about 70 mole percent naphthalenedicarboxylate groups based on total carboxylate groups and including one or more catalysts having a total concentration by weight in a range of 10 to 1000 ppm;
wherein the third monolithic layer has a thickness in the range of about 5 μm to about 300 μm; and
wherein the third monolithic layer is substantially free of light scattering, non-catalyst particulate matter.

Embodiment 9 is the brightness enhancement film of embodiment 1, further comprising a second microstructured layer adjacent the first monolithic layer opposite the first microstructured layer and a second monolithic layer adjacent the second microstructured layer opposite the first monolithic layer.

Embodiment 10 is the brightness enhancement film of embodiment 9, wherein the first plurality of microstructures include linear prisms extending in a first direction and the second microstructured layer includes a second plurality of microstructures on a major surface of the second microstructured layer opposite the second monolithic layer, wherein the second plurality of microstructures include linear prisms extending in a second direction different from the first direction.

Embodiment 11 is the brightness enhancement film of embodiment 1, wherein the first monolithic layer has a haze less than about 1 percent.

Embodiment 12 is the brightness enhancement film of embodiment 1, wherein the one or more catalysts is selected from the group consisting of manganese(II) acetate, cobalt(II) acetate, antimony(III) acetate, and combinations thereof Embodiment 13 is the brightness enhancement film of embodiment 1, wherein the first polyester has an intrinsic viscosity of at least 0.45 dL/g and less than 0.5 dL/g.

Embodiment 14 is a display comprising the brightness enhancement film of embodiment 1.

Embodiment 15 is a brightness enhancement film comprising:
a first monolithic layer;
a first microstructured layer adjacent the first monolithic layer, the first microstructured layer having a first major surface and an opposing second major surface, the first major surface comprising a first plurality of microstructures, and the second major surface facing the first monolithic layer;
wherein the first monolithic layer comprises a first polyester including at least about 70 mole percent naphthalenedicarboxylate groups based on total carboxylate groups;
wherein the first monolithic layer has a thickness in the range of about 5 μm to about 300 μm; and
wherein the first monolithic layer has a haze less than about 1 percent.

Embodiment 16 is the brightness enhancement film of embodiment 15, wherein the first microstructured layer is immediately adjacent a primer layer and the first monolithic layer is immediately adjacent the primer layer opposite the first microstructured layer.

Embodiment 17 is the brightness enhancement film of embodiment 15, further comprising a second microstructured layer disposed between the first microstructured layer and the first monolithic layer, the second microstructured layer including light diffusing microstructures.

Embodiment 18 is the brightness enhancement film of embodiment 15, further comprising a durable layer adjacent the first monolithic layer opposite the first microstructured layer.

Embodiment 19 is the brightness enhancement film of embodiment 18, wherein the durable layer has a microstructured surface, the microstructured surface including light diffusing microstructures.

Embodiment 20 is the brightness enhancement film of embodiment 15, wherein the first monolithic layer has an out-of-plane birefringence having an absolute value of at least about 0.15.

Embodiment 21 is the brightness enhancement film of embodiment 15, further comprising a second monolithic layer adjacent the first monolithic layer opposite the first microstructured layer.

Embodiment 22 is the brightness enhancement film of embodiment 21, further comprising a third monolithic layer adjacent the second monolithic layer opposite the first monolithic layer,
wherein the third monolithic layer comprises a second polyester including at least about 70 mole percent naphthalenedicarboxylate groups based on total carboxylate groups;
wherein the third monolithic layer has a thickness in the range of about 5 μm to about 300 μm; and
wherein the third monolithic layer has a haze less than about 1 percent.

Embodiment 23 is the brightness enhancement film of embodiment 15, further comprising a second microstructured layer adjacent the first microstructured layer opposite the first microstructured layer and a second monolithic layer adjacent the second microstructured layer opposite the first monolithic layer.

Embodiment 24 is the brightness enhancement film of embodiment 23, wherein the first plurality of microstructures include linear prisms extending in a first direction and the second microstructured layer includes a second plurality of microstructures on a major surface of the second microstructured layer opposite the second monolithic layer, wherein the second plurality of microstructures include linear prisms extending in a second direction different from the first direction.

Embodiment 25 is the brightness enhancement film of embodiment 15, wherein the first monolithic layer is substantially free of non-catalyst particulate matter.

Embodiment 26 is the brightness enhancement film of embodiment 15, wherein the first monolithic layer comprises one or more catalysts having a total concentration by weight in a range of 10 to 1000 ppm.

Embodiment 27 is the brightness enhancement film of embodiment 26, wherein the one or more catalysts is selected from the group consisting of manganese(II) acetate, cobalt(II) acetate, antimony(III) acetate, and combinations thereof.

Embodiment 28 is the brightness enhancement film of embodiment 15, wherein the first polyester has an intrinsic viscosity of at least 0.45 dL/g and less than 0.5 dL/g.

Embodiment 29 is a display comprising the brightness enhancement film of embodiment 15.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A brightness enhancement film comprising:
a first monolithic layer;
a first microstructured layer adjacent the first monolithic layer, the first microstructured layer having a first major surface and an opposing second major surface, the first major surface comprising a first plurality of microstructures, and the second major surface facing the first monolithic layer;
a second monolithic layer immediately adjacent the first monolithic layer opposite the first microstructured layer; and
a third monolithic layer immediately adjacent the second monolithic layer opposite the first monolithic layer,
wherein the first monolithic layer comprises a first polyester including at least about 70 mole percent naphthalenedicarboxylate groups based on total carboxylate groups and including one or more catalysts having a total concentration by weight in a range of 10 to 1000 ppm;
wherein each of the first and third monolithic layers has a thickness in the range of about 5 μm to about 300 μm, and the second monolithic layer has a thickness greater than the thickness of the first monolithic layer; and
wherein each of the first and third monolithic layers is substantially free of light scattering, non-catalyst particulate matter.

2. The brightness enhancement film of claim 1, further comprising a second microstructured layer disposed between the first microstructured layer and the first monolithic layer, the second microstructured layer including light diffusing microstructures.

3. The brightness enhancement film of claim 1, further comprising a durable layer adjacent the first monolithic layer opposite the first microstructured layer.

4. The brightness enhancement film of claim 3, wherein the durable layer has a microstructured surface, the microstructured surface including light diffusing microstructures.

5. The brightness enhancement film of claim 1, wherein the first monolithic layer has an out-of-plane birefringence having an absolute value of at least about 0.15.

6. The brightness enhancement film of claim 1,
wherein the third monolithic layer comprises a second polyester including at least about 70 mole percent naphthalenedicarboxylate groups based on total carboxylate groups and including one or more catalysts having a total concentration by weight in a range of 10 to 1000 ppm.

7. The brightness enhancement film of claim 1, further comprising a second microstructured layer adjacent the first monolithic layer opposite the first microstructured layer.

8. The brightness enhancement film of claim 7, wherein the first plurality of microstructures include linear prisms extending in a first direction and the second microstructured layer includes a second plurality of microstructures, wherein the second plurality of microstructures include linear prisms extending in a second direction different from the first direction.

9. The brightness enhancement film of claim 1, wherein the first monolithic layer has a haze less than about 1 percent.

10. A display comprising the brightness enhancement film of claim 1.

11. A brightness enhancement film comprising:
a first monolithic layer;
a first microstructured layer adjacent the first monolithic layer, the first microstructured layer having a first major surface and an opposing second major surface, the first major surface comprising a first plurality of microstructures, and the second major surface facing the first monolithic layer;
a second monolithic layer immediately adjacent the first monolithic layer opposite the first microstructured layer; and
a third monolithic layer immediately adjacent the second monolithic layer opposite the first monolithic layer,
wherein the first monolithic layer comprises a first polyester including at least about 70 mole percent naphthalenedicarboxylate groups based on total carboxylate groups;
wherein each of the first and third monolithic layers has a thickness in the range of about 5 μm to about 300 μm, and the second monolithic layer has a thickness greater than the thickness of the first monolithic layer; and
wherein each of the first and third monolithic layers has a haze less than about 1 percent.

12. The brightness enhancement film of claim 11, further comprising a second microstructured layer disposed between the first microstructured layer and the first monolithic layer, the second microstructured layer including light diffusing microstructures.

13. The brightness enhancement film of claim 11, further comprising a durable layer adjacent the first monolithic layer opposite the first microstructured layer.

14. The brightness enhancement film of claim 13, wherein the durable layer has a microstructured surface, the microstructured surface including light diffusing microstructures.

15. The brightness enhancement film of claim 11, wherein the first monolithic layer has an out-of-plane birefringence having an absolute value of at least about 0.15.

16. The brightness enhancement film of claim 11,
wherein the third monolithic layer comprises a second polyester including at least about 70 mole percent naphthalenedicarboxylate groups based on total carboxylate groups.

17. The brightness enhancement film of claim 11, further comprising a second microstructured layer adjacent the first monolithic layer opposite the first microstructured layer.

18. The brightness enhancement film of claim 17, wherein the first plurality of microstructures include linear prisms extending in a first direction and the second microstructured layer includes a second plurality of microstructures wherein the second plurality of microstructures include linear prisms extending in a second direction different from the first direction.

19. The brightness enhancement film of claim 11, wherein the first monolithic layer is substantially free of non-catalyst particulate matter.

20. The brightness enhancement film of claim 11, wherein the first monolithic layer comprises one or more catalysts having a total concentration by weight in a range of 10 to 1000 ppm.

21. A display comprising the brightness enhancement film of claim 11.

22. The brightness enhancement film of claim 11 having an overall thickness less than about 300 μm.

23. The brightness enhancement film of claim 1 having an overall thickness less than about 300 μm.

* * * * *

UNITED STATES PATENT AND TRADEMARK OFFICE
CERTIFICATE OF CORRECTION

PATENT NO. : 10,001,587 B2
APPLICATION NO. : 14/671148
DATED : June 19, 2018
INVENTOR(S) : Richard Liu Page 1 of 1

It is certified that error appears in the above-identified patent and that said Letters Patent is hereby corrected as shown below:

In the Specification

Column 14
Line 67; After "thereof" insert -- . --.

In the Claims

Column 18
Line 33; In Claim 18, after "microstructures" insert -- , --.

Signed and Sealed this
Nineteenth Day of February, 2019

Andrei Iancu
*Director of the United States Patent and Trademark Office*